(12) United States Patent
Mehta et al.

(10) Patent No.: US 7,327,983 B2
(45) Date of Patent: Feb. 5, 2008

(54) RF-BASED ANTENNA SELECTION IN MIMO SYSTEMS

(75) Inventors: Neelesh B. Mehta, Medford, MA (US); Pallav Sudarshan, Raleigh, NC (US); Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 672 days.

(21) Appl. No.: 10/877,686

(22) Filed: Jun. 25, 2004

(65) Prior Publication Data

US 2005/0287962 A1    Dec. 29, 2005

(51) Int. Cl.
*H04B 1/10* (2006.01)
*H04B 15/00* (2006.01)

(52) U.S. Cl. ................. 455/63.1; 455/101; 455/562.1; 455/66.1

(58) Field of Classification Search ................ 455/101, 455/103, 500, 517, 562.1, 69, 506, 65, 132, 455/133, 67.11, 272, 1, 450, 126, 277.1, 21, 455/24, 63.1, 66.1; 375/267, 299, 146, 152
See application file for complete search history.

(56) References Cited

U.S. PATENT DOCUMENTS 7,099,678 B2* 8/2006 Vaidyanathan .............. 455/500

2003/0068983 A1* 4/2003 Kim et al. ................... 455/561
2004/0171385 A1* 9/2004 Haustein et al. ............ 455/450
2005/0169396 A1* 8/2005 Baier et al. ................. 375/267

FOREIGN PATENT DOCUMENTS

EP         1376920 A1      6/2002
WO    WO2004/012359 A2    2/2004

OTHER PUBLICATIONS

G. J. Foschini and M. J. Gans, "On the limits of wireless communications in a fading environment when using multiple antennas," *Wireless Personal Commun.*, vol. 6. pp. 315-335, Mar. 1998.
V. Tarokh, N. Seshadri, A. R. Calderbank, "Space-Time Codes for High Data Rate Wireless Communication: Performance Criterion and Code Construction," IEEE Trans. Inform. Theory, vol. 44, pp. 744-765, Mar. 1999.
A. F. Molisch, M. Z. Win, J. H. Winters, "Capacity of MIMO Systems with Antenna Selection," Proc. IEEE Int. Contr. Conf., pp. 570-574, Helsinki, Finland, Jun. 2001.

(Continued)

*Primary Examiner*—Edward F. Urban
*Assistant Examiner*—John J. Lee
(74) *Attorney, Agent, or Firm*—Dirk Brinkman; Clifton D. Mueller; Gene V. Vinokur (57) ABSTRACT

A method is presented for processing signals of a multiple-input, multiple-output communications system in the RF domain. The system includes multiple transmit antennas and multiple receive antennas connected by a wireless channel. A matrix M is generated based on long-term characteristics of the wireless channel. The matrix M is multiplied times input RF signals to obtain output RF signals. The matrix can be generated in a transmitter, a receiver, or both.

15 Claims, 9 Drawing Sheets

OTHER PUBLICATIONS

A. F. Molisch, "MIMO systems with Antenna Selection—an Overview," Proc. IEEE Radio Wireless Conf., Boston, MA, Aug. 2003.

R. S. Blum, J. H. Winters, "On Optimum MIMO with Antenna Selection," Proc. IEEE Int. Contr. Conf., pp. 3021-3025, Anchorage, AK, May 2003.

R. W. Heath, S. Sandhu, A. Paulraj, "Antenna Selection for Spatial Multiplexing Systems with Linear Receivers," IEEE Commun. Letters, vol. 5, No. 4, pp. 142-144, Apr. 2001.

I. Bahceci, T. Duman, Y. Altunbasak,"Antenna Selection for Multiple-Antenna Transmission Systems: Performance Analysis and Code Construction," IEEE Trans. Inform. Theory, vol. 49, No. 10, pp. 2669-2681, Oct. 2003.

D. A. Gore, A. Paulraj, "MIMO Antenna Subset Selection With Space-Time Coding," IEEE Trans. Signal Processing, vol. 50, No. 10, pp. 2580-2588, Oct. 2002.

A. Gorokhov, D. Gore, A. Paulraj, "Receive Antenna Selection for MIMO Flat-Fading Channels: Theory and Algorithms," IEEE Trans. Inform. Theory, vol. 49, No. 10, pp. 2687-2696, Oct. 2003.

M. S. Alouini, A. Scaglione, G. B. Giannakis,"PCC: Principal Components Combining for Dense Correlated Multipath Fading Environments," Proc. Veh. Technol. Conf., vol. 5, pp. 2510-2517, Sep. 2000.

O. Oyman, R. U. Nabar, H. Bolcskei, A. J. Paulraj, "Characterzing the Statistical Properties of Mutual Information in MIMO Channels," IEEE Trans. Signal Processing, vol. 51, No. 11, pp. 2784-2795, Nov. 2003.

T. Ohira, "Analog Smart Antennas: An Overview," Int. Symposium on Personal, Indoor and Mobile Radio Commun., vol. 4, pp. 1502-1506, Lisboa, Portugal, Sep. 2002.

Alkhansari and Gershman, "Fast Antenna Subset Selection in MIMO Systems," IEEE Trans. Sig. Proc., pp. 339-347, Feb. 2004.

Molisch, A. F. et al. "FFT-Based Hybrid Antenna Selection Schemes for Spatially Correlated MIMO Channels" IEEE Communications Letters, vol. 8, No. 1, pp. 36-38. Jan. 2004. XP001186238.

\* cited by examiner

RF-BASED ANTENNA SELECTION IN MIMO SYSTEMS

FIELD OF THE INVENTION

This invention relates generally to multiple-input, multiple-output communications systems, and more particularly to selecting antennas in such systems.

BACKGROUND OF THE INVENTION

The bandwidth of a wireless communications channel can be increased significantly by employing multiple antenna elements (MAE) at a transmitter and a receiver, Foschini et al., "On the Limits of Wireless Communications in a Fading Environment When Using Multiple Antennas," Wireless Pers. Commun., Vol. 6, No. 3, pp. 311-335, March 1998.

Multiple antennas can improve bit rates using spatial multiplexing, where different data streams are transmitted by each antenna, or enhance the diversity of the channel, where copies of the same data stream are transmitted on all of the antennas, Foschini, "Layered Space-Time Architecture for Wireless Communication in a Fading Environment When Using Multiple Antennas," Bell Labs. Tech. J., vol. 1, no. 2, pp. 41-59, 1996, and Tarokh et al., "Space-Time Codes for High Data Rate Wireless Communication: Performance Criterion and Code Construction," IEEE Trans. Inform. Theory, vol. 44, pp. 744-765, March 1999.

However, an important factor limiting multiple input, multiple output (MIMO) systems is the increased system and hardware complexity. Each transmit antenna requires a RF chain including a modulator, a D/A converter, and a power amplifier. Each receive antenna requires a RF chain including a low noise amplifier, a demodulator, and an A/D converter. These chains are expensive. Furthermore, the sophisticated signal processing required for realizing the high rates achievable by MIMO techniques can be prohibitive for systems with a large number of antenna elements. Therefore, techniques that select and process a subset of the received signals, which reduces the number of demodulator chains needed, have received considerable attention. These methods are often referred to as "antenna selection." Hereinafter, the term "antenna selection" is used to mean selecting and processing signals fed to or received from the antennas.

Given sufficient RF chains, antenna selection at the receiver does not reduce the diversity gain of the MIMO system. However, it does lead to a loss in the coding gain. The loss is bounded by $10 \log_{10}(N_r/L)$ dB, where $N_r$ is the number of available receive antennas and L is the number of demodulator chains selected, Ghrayeb et al., "Performance Analysis of MIMO Systems with Antenna Selection Over Quasi-Static Fading Channels," IEEE Trans. Veh. Technol., Vol. 52, No. 2, pp. 281-288, March 2003. For a detailed description of various antenna selection techniques based on various criteria, such as output signal to noise ratio (SNR), capacity, etc., and an evaluation of their performance, see Heath et al., "Antenna Selection for Spatial Multiplexing Systems with Linear Receivers," IEEE Commun. Letters, Vol. 5, No. 4, pp. 142-144, April 2001, and Bahceci et al., "Antenna Selection for Multiple-Antenna Transmission Systems: Performance Analysis and Code Construction," IEEE Trans. Inform. Theory, Vol. 49, No. 10, pp. 2669-2681, October 2003.

Another issue is that considerable signal processing power is still required to implement a method that selects the best L out of $N_r$ received signals. The selection needs to be carried out every time the instantaneous channel state changes. Antenna selection therefore requires continuous monitoring and ranking of the channel coefficients in real-time, which is a complex task.

The complexity of the antenna selection process depends on the number of possibilities that need to be examined. When L outputs are selected from $N_r$ antenna outputs, the number of possibilities is $$\binom{N_r}{L}.$$

Reducing the number of possibilities reduces the signal processing power required to implement antenna selection at a transmitter or a receiver.

Low complexity decremental searches for use in antenna selection are known for the case when a channel matrix H is spatially white, i.e., its entries are zero mean complex Gaussian independent random variables, Gorokhov et al., "Receive Antenna Selection for MIMO Flat-Fading Channels: Theory and Algorithms," IEEE Trans. Inform. Theory, Vol. 49, No. 10, pp. 2687-2696, October 2003, and Gharavi-Alkhansari and Gershman, "Fast Antenna Subset Selection in MIMO Systems," IEEE Trans. Sig. Proc., pp. 339-347, February 2004.

For a correlated channel, a joint RF and baseband design can significantly increase the coding gain realized by the antenna selection system for the same number of demodulator chains, L, while still extracting full diversity, Molisch et al., "FFT-Based Hybrid Antenna Selection Schemes for Spatially Correlated MIMO Channels," IEEE Int. Symposium on Personal, Indoor and Mobile Radio Commun., September 2003, and U.S. patent application Ser. No. 10/629,240 filed on Jul. 29, 2003, by Molisch et al.

That joint RF and baseband design uses a linear RF pre-processing matrix, M, in the RF domain. When used at the receiver, the pre-processing matrix is followed by down-conversion and antenna selection, if necessary, followed by optimal combining in the baseband. Specifically, for the transmit diversity and spatial multiplexing cases, the optimal linear RF pre-processing matrix M, and a baseband combining vector w, for spatial diversity cases, can be obtained when M is allowed to vary instantaneously with each channel use. When used at the transmitter, the processing uses a weight vector multiplier for spatial diversity cases, followed by a D/A converter, and a RF modulator, and a RF pre-processing matrix that outputs $N_t$ signals, which are transmitted from $N_t$ antennas.

One solution requires changing the parameters and switching in the RF domain on an instantaneous basis, which can lead to higher RF losses. A sub-optimal, yet simple solution, in the form of an $N_r \times N_r$ FFT Butler matrix, can also be used as the RF pre-processing matrix. Employing a fast Fourier transform (FFT) changes the processing at the receiver from an antenna selection problem to a beam selection problem. For a uniform linear array (ULA) receiver operating in a strongly correlated environment, the FFT determines beams oriented in certain fixed directions in space. In some cases, the gains are close to a full complexity receiver. While that scheme yields gains, it is certainly not optimal. Its performance depends on the direction in which the electromagnetic (EM) waves arrive as well as the geometry of the MAE.

In particular, when the signals arrive in a direction that falls in the minima of the FFT beam pattern, the performance degrades. It is therefore desired to determine the optimal matrix M. More particularly, it is desired to derive the single RF pre-processing matrix design using only the knowledge of the long-term fading statistics of the channel.

A number of prior art design scenarios are now described in greater detail for spatial diversity gain transmission and spatial multiplexing gain transmission.

Full Complexity (FC) for Spatial Diversity Gain Transmission

A full complexity (FC) prior art receiver uses signals from all of the $N_r$ antennas 140 and processes the received signals using $N_r$ demodulator chains, one for each antenna element. By definition, that receiver architecture achieves the highest SNR among all the receivers. For a FC receiver, the transmitter weight vector v, and the receiver combining vector w need to be found such that the SNR is maximized, i.e., $$\gamma_{FC} = \max_{v,w}(w^\dagger H v)^2,$$

such that $\|v\|^2=1$, $\|w\|^2=1$.

Here, H is the channel matrix, with its $(i,j)^{th}$ element representing the link state between the $i^{th}$ receive antenna and the $j^{th}$ transmit antenna. The solution to the above problem is the maximum ratio transmission (MRT) at the transmitter and the maximum ratio combining (MRC) at the receiver. The values $V_{FC}$ and $W_{FC}$ are the right and left singular vectors, respectively, corresponding to the largest singular value of the channel matrix H.

The value $\gamma_{FC}$ is given by $$\gamma FC = \frac{\rho}{N_t}\lambda_1^2(H),$$

where $\lambda_1(H)$ is the largest singular value of the channel matrix H.

Pure Antenna Selection (PAS) for Spatial Diversity Gain Transmission

A prior art pure antenna selection corresponds to the prior art FC receiver operating on a reduced channel matrix, $\tilde{H}$. The reduced channel matrix $\tilde{H}$ is formed by selecting L out of $N_r$ rows of the channel matrix H. This is referred to as '$L/N_r$ selection'. The set of all $L \times N_t$ sub-matrices of the channel matrix H is denoted by $S_L(H)$. The optimal antenna selection receiver selects one sub-matrix, out of $$\binom{N_r}{L}$$

elements in the set of submatrices $S_L(H)$ that maximizes SNR. The SNR $\gamma_{sel}$ for that receiver is given by $$\gamma_{sel} = \max_{\tilde{H} \in S_L(H)} \frac{\rho}{N_t}\lambda_1^2(\tilde{H}).$$

FFT Pre-Processing Followed by Selection for Spatial Diversity Gain Transmission In this prior art technique, the received observation streams are sent through a FFT Butler matrix F, before $L/N_r$ selection and down-conversion, see Molisch et al., "FFT-Based Hybrid Antenna Selection Schemes for Spatially Correlated MIMO Channels," IEEE Int. Symposium on Personal, Indoor and Mobile Radio Commun., September 2003. Therefore, selection is performed on a virtual channel FH. Then, the output SNR, $\gamma_{FFT}$, is $$\gamma FFT = \max_{\tilde{H} \in S_L(FH)} \frac{\rho}{N_t}\lambda_1^2(\tilde{H}).$$

An optimal combining vector $w_{FFT}$ is the left singular vector corresponding to the largest singular value of the reduced channel matrix $\tilde{H}$. Given that the matrix F is a unitary matrix, the performance of the FFT is the same as pure selection for an i.i.d. fading channel. However, for a spatially correlated channel, the FFT yields performance gains by aligning the receiver with beams that arrive at fixed angles in space.

Figure 2:
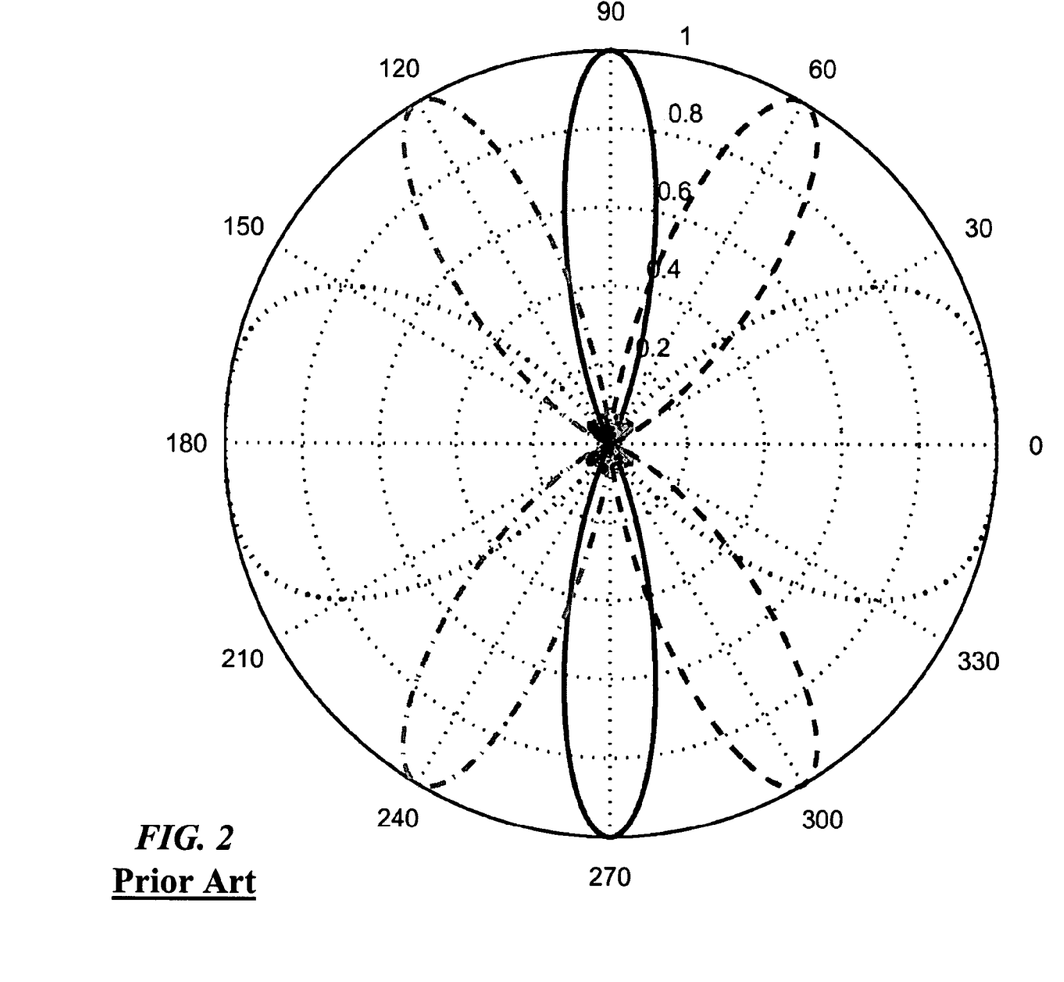
FIG. 2 is a graph of a beam pattern for FFT pre-processing as a function of an azimuth angle as in the prior art.

FIG. 2 plots the prior art beam pattern, as a function of the angle-of-arrival (AoA), formed by FFT pre-processing for a ULA with spacing $d/\lambda=0.5$, and $N_r=4$, where $\lambda$ is the wavelength. It can clearly be see that while FFT pre-processing gives promising gains for AoA 0°, 60°, 90°, 270°, and 300°, the gains are lower at other angles.

Instantaneous Time-Variant Pre-Processing for Spatial Diversity Gain Transmission In contrast to the FFT, where the pre-processing matrix M is completely fixed, a prior art receiver architecture can adapt the matrix M to the CSI instantaneously. That is, the processing is sensitive to short-term channel characteristics. The weight vector $w_{FC}$ can be approximated by dividing the processing load between a $L \times N_r$ phase-shift matrix in the RF domain, followed by an L-to-1 linear combiner in the baseband domain. If $L \geq 2$, the weight $w_{FC}$ can be reproduced exactly. Therefore, the performance achievable with $L \geq 2$ corresponds to that of the FC receiver. For L=1, the RF pre-processing is a phase approximation to $w_{FC}$. Although that technique is sub-optimal, it performs much better than the pure antenna selection described above.

The capacity expressions for different prior art receiver architectures for spatial multiplexing gain transmissions can be expressed as follows. In spatial multiplexing, capacity, which measures the net throughput achieved by transmitting multiple streams simultaneously, is a more appropriate performance metric than SNR.

Full Complexity (FC) for Spatial Multiplexing Gain Transmission

Here, the FC receiver combines signals from all the antennas. As in the diversity case, this requires $N_r$ demodulator chains. The channel capacity of the FC receiver is given by $$C_{FC} = \log_2 \left| I_{N_t} + \frac{\rho}{N_t}H^\dagger H \right|.$$

where $|.|$ denotes the matrix determinant. By definition, this is the largest achievable capacity among all receiver architectures.

Pure Antenna Selection for Spatial Multiplexing Gain Transmission

Pure antenna selection at the receiver corresponds to selecting L out of $N_r$ rows of H such that the capacity of the reduced channel, $\tilde{H}$, is maximized:

$$C_{sel} = \max_{\tilde{H} \in S_L(H)} \log_2 \left| I_{N_t} + \frac{\rho}{N_t} \tilde{H}^\dagger \tilde{H} \right|.$$

FFT Pre-Processing Followed by Selection for Spatial Multiplexing Gain Transmission When FFT is used as the pre-processing matrix, the selection is performed on the virtual channel FH and the capacity is given by $$C_{FFT} = \max_{\tilde{H} \in S_L(FH)} \log_2 \left| I_{N_t} + \frac{\rho}{N_t} \tilde{H}^\dagger \tilde{H} \right|.$$

The beam selection argument used in the diversity case applies here as well. The FFT processing realizes lower gains when one of the FFT beam directions is not aligned with the AoA.

Time-Variant Pre-Processing for Spatial Multiplexing Gain Transmission

The instantaneous time-variant optimal L×$N_r$ pre-processing matrix, which maximizes the capacity of the channel, can be described as follows. The optimal matrix is the conjugate transpose of the L left singular vectors of H corresponding to its L largest singular values.

The capacity for this receiver architecture is given by, $$C = \sum_{i=1}^{L} \log_2 \left( 1 + \frac{\rho}{N_t} \lambda_i^2 \right),$$

where $\lambda_i$ is the $i^{th}$ largest singular value of the channel matrix H.

Although the joint design yields performance gains over conventional antenna selection techniques, practical receiver design and implementation considerations impose additional constraints on M. While amplitude adjustments in the RF domain are possible, power efficient designs are expensive. With recent technological advancements in microwave ICs, design and fabrication of variable phase-shifters is considerably cheaper and feasible. Therefore, a phase-only approximation to M is also desirable.

SUMMARY OF THE INVENTION

The invention increases the bandwidth of a wireless communications channel by employing multiple antenna elements at a transmitter and at a receiver. In order to decrease the complexity of the system, the invention selects signals from a subset of available signals for further processing.

While prior art antenna selection can achieve a maximum diversity gain with fewer RF chains, beam-forming gains are reduced. For spatially correlated wireless channels, joint RF-baseband design according to the invention can outperform prior art antenna selection and achieve performance close to a full complexity receiver with far fewer RF chains and a lower complexity.

According to the invention, the joint design at the receiver uses a RF pre-processing matrix M of size $N_r$×K, where $N_r$ is the number of receive antennas. The K outputs from the matrix M are then down-converted. This is followed by an antenna selection switch that selects, based on an estimate of the channel state, L out of the K streams. The L streams output by the switch are optimally combined.

The invention also uses a similar reciprocal joint design at the transmitter. The joint design at the transmitter uses an L/K router followed by a K×$N_t$ RF pre-processing matrix that is connected to $N_t$ transmit antennas. The L transmit streams input to the L/K router are routed to L out of the K inputs of the matrix M. This antenna selection process considers $$\binom{K}{L}$$

possibilities. Reducing the value K reduces the complexity of the process.

The invention considers both transmit diversity and spatial multiplexing MIMO techniques. RF pre-processing for these MIMO techniques is also applicable to systems such as MIMO orthogonal frequency division multiplexing (OFDM) systems, where information is transmitted over multiple carriers, and appropriately combined at the receiver. MIMO-OFDM is a solution for transmitting over frequency selective wireless channels. The invention also derives optimum RF pre-processing matrices, which are based only on the large-scale parameters of the channel, which vary slower than the small-scale parameters, on which a majority of the prior art is based.

This decreases the number of RF elements employed in the receiver and also enables the use of computationally less-intensive processes. When employed at the transmitter, using long-term channel statistics obviates the need for the receiver to feed back the instantaneous channel state to the transmitter, as in a closed loop system. Only a low bandwidth feedback channel is required. The feedback gives the slowly varying nature of the large-scale statistics. The transmitter can also estimate these statistics without instantaneous feedback from the receiver.

An embodiment where the matrix M reduces the number of RF outputs to match the number of available demodulator chains is also described. In this embodiment, there is no selection.

For receivers, adjusting the parameter K allows for a trade-off between the hardware complexity of the switch, the RF pre-processing matrix, the signal processing power required to select the best L out of K streams for the switch, and the system performance. For transmitters, adjusting the parameter K allows for a trade-off between the hardware complexity of the router, the RF pre-processing matrix, the signal processing power required to route the L signals, and the system performance. Increasing K improves system performance at the expense of greater hardware complexity and greater signal processing power requirement, and vice versa.

Performance close to that of a full complexity receiver is possible. A beam-pattern-based geometric is also described to justify the performance gains.

To accommodate practical design constraints imposed by current variable phase-shifter technology, a sub-optimal phase approximation coupled with on-off switches is also provided. An optimal method for determining the switches to turn on or off is also provided.

DETAILED DESCRIPTION OF THE PREFERRED EMBODIMENT

System and Channel Model

Our invention provides a system and method for RF pre-processing and selecting a subset of the processed outputs in a multiple-input, multiple-output (MIMO) wireless communication system subject to spatially correlated MIMO channel conditions. Our invention is applicable to a general multiple antenna system that uses multiple antennas at the transmitter or at the receiver, or both.

Specifically, the invention generates a matrix M based on long-term characteristics of the wireless channel. The matrix M is multiplied times input RF signals to obtain output RF signals. The matrix can be generated in a transmitter, a receiver, or both.

Figure 1:
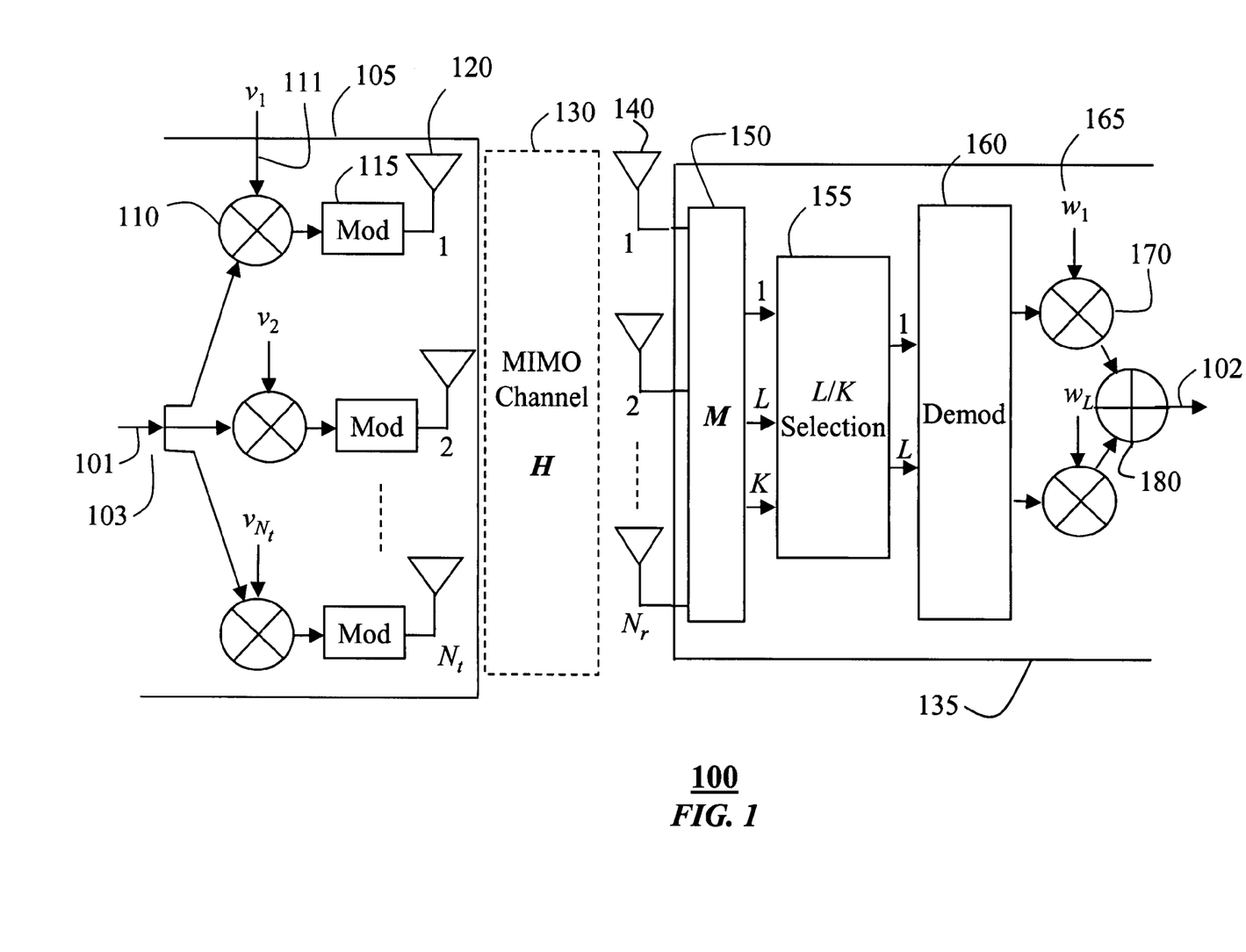
FIG. 1 is a block diagram of a wireless communications system that uses the invention for diversity transmission.

FIG. 1 shows a system 100 that can use our invention to maximize diversity gain. In a transmitter 105, partially shown, copies of an input signal stream 101 are multiplied 110 by an $N_t$-dimensional complex weighting vector v 111 before modulation 115 to passband. Each signal is then applied to a different one of $N_t$ transmitting antennas 120.

The modulated signals pass through a MIMO channel 130, with channel characteristics H. It should be noted that the channel characteristics are generally classified as spatial or temporal. The spatial characteristics are due to various antenna arrangements and parameters such as the angle of arrival and departure of the EM waves, the angular dispersion at the transmitter and receiver due to scatterer positions, effects of polarization, etc. The temporal characteristics are due to the multiple copies, from various scatterers, of the transmitted signal(s) arriving at the receiver. Temporal variations can by characterized by Raleigh, Ricean, and Nakagami fading distributions, for example.

Time-Variant vs. Time-Invariant

Generally, the channel characteristics can be described over a short-term (time-variant), or a long-term (time-invariant). By short-term, we mean changes in the channel characteristics due to small varying distances between the transmitter and the receiver, which can be in terms of half a wavelength, i.e., times in the millisecond range, for even a slow moving mobile receiver. By long-term, we mean large-scale variations that are statistically described as encompassing times of a second or more, i.e., the long-term is at least one order or more of magnitude greater than the short-term. The invention is concerned with long-term characteristics. That is, the changing channel conditions are still considered, but now for much longer time intervals and distances. This should be distinguished from the FFT pre-processing with a fixed Butler matrix, which does not consider changing channel conditions at all.

At the receiver 135, the received signals are passed through a linear matrix operation M 150. In the preferred embodiment, the matrix elements are expressed in terms of amplitude and phase. Each element of the matrix 150 can be controlled by an individual on-off switch, e.g., a binary zero/one mask, if available. Then, only a subset of signals L from the $N_r$ possible antennas are selected 155 for demodulation 160. The demodulated signals are then subjected to maximal ratio combining 170 using the receiver weight vector w 165, and combined 180 to obtain an output data stream 102 that is an estimate of the input data stream 101.

As shown in FIG. 1 for diversity transmission, copies of the same information symbol are transmitted on each of the $N_t$ antennas 120. The channel state information (CSI) is available at the receiver 135, and may be available at the transmitter 105.

In spatial diversity transmission, for transmit antenna i, the signal x is weighed with $v_i$, which is based on the CSI available at the transmitter. The vector v 111 is $[v_1, v_2, \ldots, v_{N_t}]^T$, where $[.]^T$ is the vector transpose.

A vector y representing the received signal is $$y = \sqrt{\frac{\rho}{N}} Hvx + n, \qquad (1)$$

where H is the $N_r \times N_t$ channel matrix representing the long-term statistics of the channel characteristics, $\rho$ is a signal-to-noise ratio of the received signal, and n is additive white Gaussian noise.

Without loss of generality, the vector n follows a distribution $N_c(0, \sigma^2 I)$, where $N_c$ denotes a complex Gaussian distribution, 0 is an all zeros mean vector, $\sigma^2$ is the noise variance, and I is an identity covariance matrix.

We adopt the well-known Kronecker correlation channel model for H. The model is expressed as:

$$H = R^{1/2} H_w T^{1/2}, \qquad (2)$$

where $H_w$ is $\sim N_c(0, 1)$. Matrices R and T are i.i.d. complex Gaussian entries and R and T are the $N_r \times N_r$ and $N_t \times N_t$ receiver and transmitter correlation matrices, respectively.

With antenna element spacing $d_r$ and $d_t$ at the receiver and the transmitter, respectively, a closed-form expression for the entries of the correlation matrices R and T is available when the angular spread is small. The $(i,j)^{th}$ element of the receive correlation matrix R is given by $$R_{ij} = \int_{-\infty}^{\infty} \frac{1}{\sqrt{2\pi}\,\sigma_r} e^{-j2\pi(j-i)d_r \cos(\theta_r + \epsilon)} e^{-\frac{\epsilon^2}{2\sigma_r^2}} d_r\epsilon,$$

$$\approx e^{-j2\pi(j-i)d_r \cos\theta_r} e^{-j2\pi(j-i)d_r \sin\sigma_r \theta_r}.$$

A similar expression exists for the transmit correlation T, as well.

We now list the known linear processing receivers for the diversity transmission. We assume that each receiver has L demodulator chains, except for the full complexity receiver, which has $N_r$ demodulator chains. Thus, L out $N_r$ available receive antenna elements need to be selected.

Optimal Long-term RF Pre-Processing for Spatial Diversity Gain

We describe two cases for long-term pre-processing for the diversity system, where long-term channel characteristics are considered. In the first case, we derive the optimal $L \times N_r$ long-term pre-processing matrix $M_{TI}$ that maximizes the average SNR at the receiver output only. Because the pre-processor only outputs L streams, the long-term pre-processing performs an implicit selection. Therefore, a subsequent selection process is not required.

In the second case, selection based on the CSI is performed after pre-processing. For this, we derive the $K \times N_r$ long-term pre-processing matrix, $M_{TI-S}$, such that the average output SNR is maximized.

In deriving the matrices $M_{TI}$ and $M_{TI-S}$, we do not impose the constraint that they are phase-only matrices. An optimized phase approximation to the solution that uses on-off switches is described below. Because multiple local maxima exist, an analytical determination of optimal phase-shifters is difficult. This motivates the use of the phase approximation.

Optimal Long-term (TI) $L \times N_r$ Pre-Processing for Spatial Diversity Gain

The matrix $M_L$ is an $L \times N_r$ pre-processing matrix at the receiver 135 shown in FIG. 1. The modified vector $\tilde{y}$ representing the received signal is $$\tilde{y} = \sqrt{\frac{\rho}{N_t}} M_L H v x + M_L n.$$

After pre-processing and down-conversion, the signals of the various antennas are combined 170 and 180 in the baseband using the weight vector w 165. In general, a noise whitening filter is required because the matrix $M_L$ is not necessarily a semi-unitary matrix. This gives rise to the term $(M_L M_L^\dagger)^{-1/2}$ in the SNR expression, where $(.)^\dagger$ denotes a matrix Hermitian $$\bar{\gamma}_{TI} = \max_{M_L, w} \varepsilon_H \left[ \frac{\rho}{N_t} \left( w^\dagger (M_L M_L^\dagger)^{-\frac{1}{2}} M_L H v \right)^2 \right],$$

such that $\|w^\dagger M_L\| = 1$, where $\varepsilon_H$ denotes an expectation with respect to the channel matrix H. The energy constraint ensures fairness among the receivers being compared.

Theorem 1: Consider a general $N_r \times N_t$ channel matrix, H, with singular value decomposition (SVD), $U\Lambda V^\dagger$. Let $u_1$ be the first column of U, and let $\lambda_1$ be the largest singular value of the channel matrix H. Then, the optimal matrix $M_L$, denoted by the matrix $M_{TI}$, which maximizes the average output SNR, subject to the energy constraint, is of the form $M_{TI} = BQ$. Here, the matrix B is any $L \times L$ full rank matrix, and the matrix Q is an $L \times N_r$ matrix given by $$Q = [\mu_1, \mu_2, \ldots, \mu_L]^\dagger,$$

where $\mu_1$ is the singular vector corresponding to the $l^{th}$ largest singular value of the covariance matrix $R_{uu} = \varepsilon[|\lambda_1^2|u_1 u_1^\dagger]$, after an eigendecomposition. Furthermore, the optimal combining vector $W_{TI}$ 165 is $$w_{TI} = \frac{(M_{TI} M_{TI}^\dagger)^{-1} M_{TI} u_1}{\|Q u_1\|}.$$

We see from Theorem 1 that the optimal Q matrix that maximizes the average SNR is obtained by principal component analysis on $\lambda_1 u_1$ and selecting the largest L principal components. The variance of $u_1$ along the eigenvectors of the covariance matrix $R_{uu}$ is equal to the corresponding eigenvalues of the covariance matrix.

Thus, the first L eigenvectors of the covariance matrix $R_{uu}$ that are selected for Q contribute the most to the variance.

Figure 3:
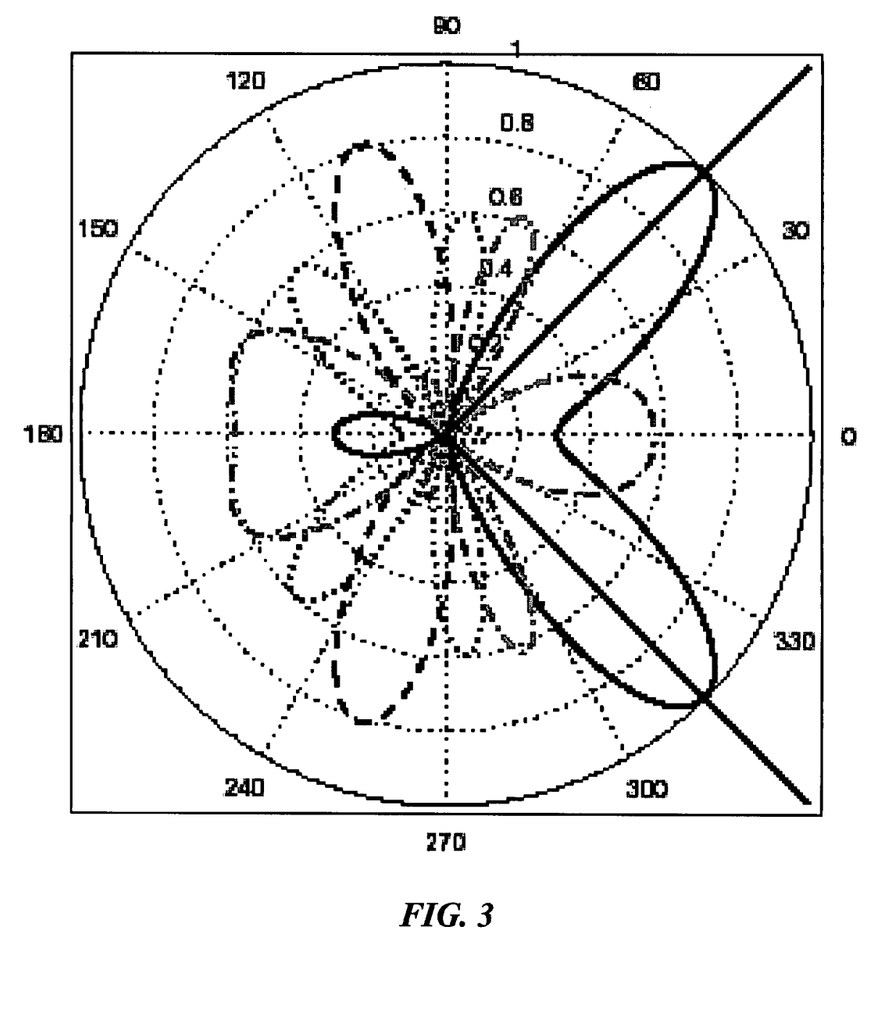
FIG. 3 is beam pattern for pre-processing with a matrix $M_{tt}$ according to the invention as a function of an azimuth angle with a mean angle of arrival of 45 degrees.
Figure 4:
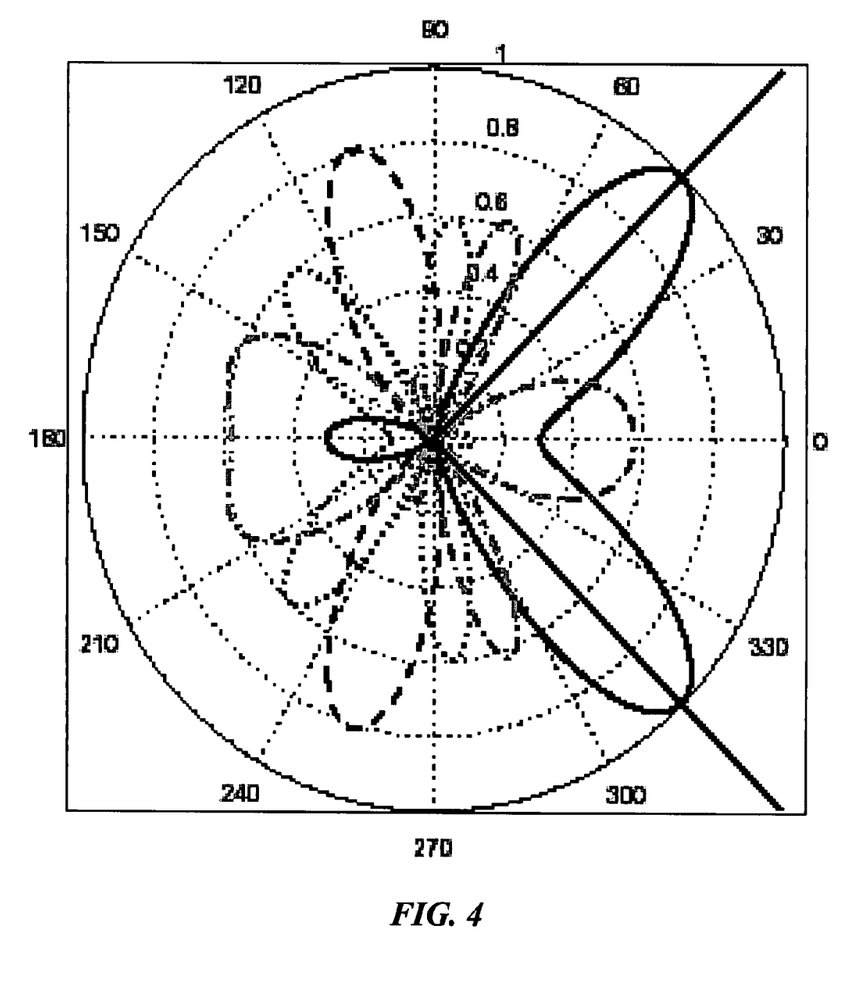
FIG. 4 is beam pattern for pre-processing with a matrix $M_{tt}$ according to the invention as a function of an azimuth angle with a mean angle of arrival of 60 degrees.

FIG. 3 and FIG. 4 show the beam patterns of $M_{TI}$ for a uniform linear array for two different directional channels, to compare the performance with the FFT pre-processing. The antenna element spacing is $d/\lambda = 0.5$, and the mean angle-of-arrival is 45° in FIG. 3, and 60° in FIG. 4. We see that the beam pattern of $M_{TI}$ adapts to the mean AoA at the receiver, and ensures substantial performance gains.

Long-term Phase-Only (TI-Ph) $L \times N_r$ Pre-Processing for Spatial Diversity The long-term pre-processing matrix $M_{TI}$ described above includes complex elements. We desire phase-only approximations for the long-term pre-processing matrix $M_{TI}$. The long-term pre-processing matrix $M_{TI} = [m_1, \ldots, m_N]$, performs a weighted sum of the received signals in the RF domain. Under the constraint of phase-only pre-processing, we use a phase matrix $\Phi$ for the matrix $M_{TI}$, where the phase matrix $\Phi = [\phi_1, \ldots, \phi_N]$ is such that for each column i, $\phi_i$ is closest to $m_i$ in angle.

Thus, the received signals, to the extent possible, still add up coherently. Each element $\phi_{ij}$ tracks the phase of $M_{ij}$, i.e., the $(i,j)^{th}$ element of the matrix $M_{TI}$, with an additional option that the element can be turned off altogether. Therefore, $$\phi_{ij} = a_{ij} e^{j \arg(M_{ij})}, \quad (4)$$

where $\phi_{ij}$ is zero or one. The angle between $\phi_i$ and $m_i$ is given by $$\theta = \frac{\phi \, m}{\|\phi\|}.$$

To minimize the angle $\mu_i$, we need to determine $a_{ij}$, $1 \leq j \leq L$. In general, this requires $O(2^L)$ computations. We present a method that requires only $O(L \log(L))$ computations.

Method for Determining Switch Configuration

1. Sort the entries of $m_i$ in descending order of absolute values of the amplitudes, to get the ordered set $\{m_{i[1]}, \ldots, m_{i[L]}\}$, where $|m_{i[1]}| \geq |m_{i[2]}| \geq |m_{i[L]}|$, and [k] denotes the index of the $k^{th}$ largest entry.

2. Define $$\theta_{il} = \frac{\phi_i^\dagger m_i}{\|\phi_i\|},$$

such that $\phi_i$ has exactly 1 non-zero entries at the positions j=[1], ..., [l]. From Equation (4), we get that these entries are the arguments of the corresponding entries of $m_i$. Thus, $$\varphi_{il} = \sum_{k=1}^{l} \frac{|m_{i[k]}|}{\sqrt{l}}, \text{ for } 1 \leq l \leq L.$$

3. Select $l_{max}$, such that $\mu_{il_{max}}$ is maximum.

4. Then, $a_{ij}$ is given by $$a_{ij} = \begin{cases} 1 & \text{if } j = [1], \ldots, [l_{max}] \\ 0 & \text{otherwise} \end{cases}.$$

Step 1 requires $O(L \log(L))$ computations, and Step 2 requires $O(L)$ operations. Thus, the above process requires $O(L \log(L))$ computations to determine $\phi_i$. Thus, our selection process performs better and requires fewer phase shifters than the prior art.

The optimal transmitting and combining weight vectors, $v_{TI-Ph}$, and, $w_{TI-Ph}$, are the right and the left singular vectors corresponding to the largest singular value of the virtual channel $\Phi H$, respectively. The SNR of the TI-Ph receiver is $$\gamma_{TI-Ph} = \frac{\rho}{N_t} (w_{TI-Ph}^\dagger \Phi H v_{TI-Ph})^2.$$

Long-term $K \times N_r$ Pre-Processing Followed by Selection (TI-S) for Spatial Diversity Gain We describe an alternative embodiment where the vector y representing the received signal is multiplied by an $K \times N_r$ pre-processing matrix, $M_N$, and L out of the K outputs of the pre-processor are selected for down-conversion.

In this case, the modified received vector becomes $$\tilde{y} = \sqrt{\frac{\rho}{N_t}} S M_N H v x + S M_N n,$$

where S is an $L \times K$ permutation matrix that selects L out of K signals. We allow the variable S to adapt instantaneously to the channel state. The modified vector is down-converted and combined 170 and 180 in the baseband. The average output SNR maximization problem now becomes $$\overline{\gamma}_{TI-S} = \max_{M_N} \varepsilon_H \left[ \max_S \frac{\rho}{N_t} \left( w^\dagger (S M_N M_N^\dagger S^\dagger)^{-\frac{1}{2}} S M_N H v \right)^2 \right] \quad (6)$$

such that $\|w^\dagger S M_N\| = 1$.

It is difficult to analytically find the matrix $M_N$ that maximizes Equation (6) because of the presence of the permutation matrix S, which depends on the channel matrix H. By inter-changing the order of $\varepsilon_H$ and max, we get the lower bound $$\overline{\gamma}_{TI-S} \geq \max_S \max_{M_N} \varepsilon_H \left[ \frac{\rho}{N_t} \left( w^\dagger (S M_N M_N^\dagger S^\dagger)^{-\frac{1}{2}} S M_N H v \right)^2 \right]. \quad (7)$$

Next, we state the following theorem.

Theorem 2: Define $U_L = \text{span}\{\mu_1, \mu_2, \ldots, \mu_K\}$, where $\mu_1$ is as defined above. Then, the $K \times N_r$ matrix $M_{TI-S}$ that maximizes the lower bound in Equation (7) is of the form $$M_{TI-S} = P[\mu_1, \mu_2, \ldots, \mu_K]^\dagger, \quad (8)$$

where P is any $K \times K$ permutation.

The method described above for determining the phase-only approximation for the matrix $M_{TI-S}$, along with on/off switches applies here, as well.

Spatial Multiplexing

Figure 5:
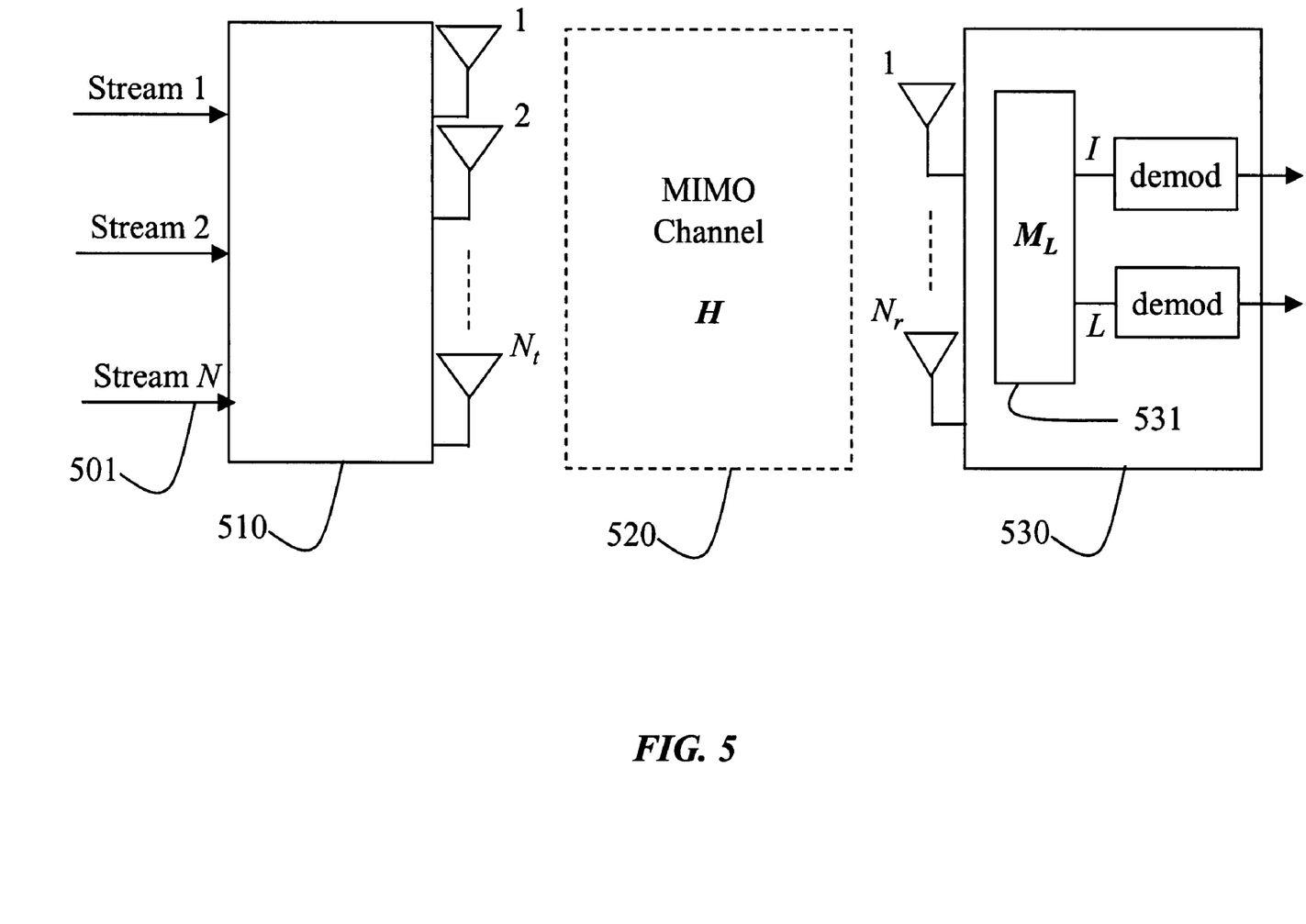
FIG. 5 is a block diagram of a system with spatial multiplexing according to the invention.

As shown in FIG. 5 for spatial multiplexing, N different data streams 501, as opposed to a single one in the diversity case, are sent concurrently from a transmitter 510 through a channel 520 to a receiver 530.

No CSI is available at the transmitter in this open loop architecture, while perfect CSI is available at the receiver. The received vector, y, for $N_r$ receive antennas is written as $$y = \sqrt{\frac{\rho}{N_t}} H x + n, \quad (12)$$

where $\rho$ is the SNR input to the receiver, H is the $N_r \times N_t$ channel matrix generated from the Kronecker model, x is the $N_t \times 1$ transmitted vector and $n \sim N_c(0, I)$ is the noise vector.

In spatial multiplexing, any scheme based on antenna selection always has a significantly reduced capacity when $L < N_r$. This is in contrast to the diversity case. In the diversity case, the output SNR depends on a single largest eigenmode of the channel, while the capacity in spatial multiplexing depends on all the eigenmodes. Reducing the number of dimensions leads to fewer available eigenmodes. Next, we list the capacity expressions for different receiver architectures according to the invention.

Long-term Pre-Processing (TI) for Spatial Multiplexing Gain

For a spatial multiplexing system, we consider two cases of long-term pre-processing. First, we derive an $L \times N_r$ matrix that maximizes the Ergodic capacity. Because this receiver outputs L streams, the receiver performs an implicit selection. We also provide a receiver architecture in which a long-term $K \times N_r$ linear pre-processing is followed by a CSI-dependent L/K selection.

$L \times N_r$ Long-term (TI) Pre-Processing for Spatial Multiplexing Gain

We perform the $L \times N_r$ long-term pre-processing such that the ergodic capacity is maximized. Let $M_L$ be an $L \times N_r$ pre-processing matrix 531, as shown in FIG. 5. The $L \times 1$ modified received vector then becomes $$\tilde{y} = \sqrt{\frac{\rho}{N_t}} M_L H x + M_L n.$$

For such a system, the ergodic capacity is $$\bar{C} = \varepsilon_{\mathcal{H}} \log_2 \left| I_{N_t} + \frac{\rho}{N_t} H^\dagger M_L^\dagger (M_L M_L^\dagger)^{-1} M_L H \right|.$$

Then, maximizing the capacity reduces to the following constrained optimization problem:

$$\bar{C} = \max_{M_L} \varepsilon_{\mathcal{H}} \log_2 \left| I_{N_r} + \frac{\rho}{N_t} H^\dagger M_L^\dagger (M_L M_L^\dagger)^{-1} M_L H \right|,$$

such that $Tr(M_L M_L^\dagger) = L.$

In general, it is very difficult to solve the above optimization problem involving ergodic capacity. Instead, we use a tight lower bound on the capacity. The lower bound is almost exact when $N_t \neq N_r$, for all SNRs of interest. When $N_t = N_r$, this bound comes within 0.5 bits/sec/Hz of the capacity for low SNR, and is again almost exact for high SNR.

Theorem 3: Consider a general $N_r \times N_t$ spatial channel matrix $H = R^{1/2} H_w T^{1/2}$. Then, the optimal matrix $M_L$ 531 is of the form $M_L = BQ$, where B is any full-rank L×L matrix, and Q is of the form $$Q = [\mu_1 \, \mu_2 \, \ldots \, \mu_L]^T,$$

where $\mu_l$ is the singular vector of R corresponding to its $l^{th}$ largest singular value, and $(.)^T$ denotes matrix transpose.

The long-term phase-shift solution is chosen to be the phase approximation to $M_L$, along lines described earlier.

K×$N_r$ Long-term (TI) Pre-Processing Followed by Selection for Spatial Multiplexing Gain Theorem 4: The $K_r \times N_r$ matrix $M_N$ is of the form $$M_N = [\mu_1, \mu_2, \ldots, \mu_K]^T.$$

The long-term phase-only solution is chosen to be the phase approximation to $M_N$, along lines described earlier.

Spatial Diversity Evaluation

For evaluating the spatial diversity system, we measure the cumulative distribution function (CDF) of the SNR. This provides a complete characterization of the SNR, as opposed to the expected value, which provides information on the first moment only.

For a highly correlated channel, TI performs within 0.1 dB of the FC receiver, even though only one demodulator chain is used. It gives up to a 5 dB benefit over conventional antenna selection methods and does not require continuous monitoring of the channel, because an implicit selection is being performed.

The performance of the sub-optimal phase approximation to the TI, described herein, is within 0.01 dB of TI. We observe that the prior art FFT pre-processing performs as well as TI pre-processing when the mean AoA direction matches with one of the FFT beams, see FIG. 2. The SNR of TI-S and TI-PhS is similar to that of TI, while the time-variant receiver gives gains identical to FC.

While TI performs as well as the FC receiver, the FFT receiver leads to a SNR loss of approximately 2 dB compared to TI. This is because $\mu_r = 45°$ lies on a null of FFT beam pattern, see FIG. 2, while the TI receiver adapts its beam pattern to utilize gains in the average AoA direction, see FIG. 3.

For a moderately correlated channel, e.g., $\mu_r = 60°$; $\sigma_r = 15°$, the TI and TI-Ph outperform pure antenna selection by 2-3 dB. However, they suffer a 1 dB loss over FC receiver. TI-S and TI-PhS have similar performance to TI for a moderately correlated channel.

When the channel is uncorrelated, the SNR of TI and TI-Ph is reduced because there is no predominant beam direction present. The performance of long-term pre-processing followed by adaptive selection (TI-S, TI-PSS) is same as that of pure selection. Note that even for an uncorrelated channel, the SNR of time-variant selection scheme matches that of FC receiver.

Spatial Multiplexing Evaluation

For evaluating the spatial multiplexing system, we measure the cumulative distribution function (CDF) of capacity in bits/sec/Hz. This provides a complete characterization of the channel capacity, as opposed to the expected value, which only provides information on the first moment.

For the spatial multiplexing system, the TI and TI-Ph show a 1 bit/sec/Hz gain over pure antenna selection. However, that performance is about 1 bit/sec/Hz worse than the FC receiver. This is in contrast to diversity transmission, where most of the FC receiver gains can be captured with a single demodulator chain. As in the diversity case, the capacity of FFT pre-processing matches that of TI for $\mu = 60°$. But its performance degrades if the AoA direction falls on the null of the FFT beam pattern. The capacity of FFT pre-processing is about 0.5 bits/sec/Hz worse than that of TI when $\mu_r = 45°$ and $\sigma_r = 60°$.

For an uncorrelated channel, as in diversity transmission, the schemes using static selection (TI, TI-PS) perform worse than pure selection, while TI-S, TI-PhS and FFT perform as well as the pure selection.

Effect of the Invention

The invention provides a joint RF-baseband design for a MIMO system that combines linear pre-processing in the RF domain and antenna selection, if necessary. This reduces the hardware complexity and signal processing power required by the MIMO system. Two MIMO techniques were considered: spatial diversity and spatial multiplexing. For both these techniques, the optimal long-term L×$N_r$ RF pre-processing matrix, $M_{TI}$, is derived. By its very design, the L×$N_r$ matrix eliminates the need for subsequent antenna selection and its associated computational complexity.

A more sophisticated receiver architecture, which uses a K×$N_r$ RF matrix followed by antenna selection is also described. At the expense of additional computations, this architecture always outperforms the L×$N_r$ matrix described above. The pre-processing matrix is designed to guarantee a performance always greater than a lower bound. A successive refinement technique is then used to further improve the performance.

For spatial diversity, optimal pre-processing projects the received vector along the L largest principal components of the scaled eigenvector of the largest left singular value of the channel. For a correlated channel, such pre-processing, while requiring the same number of demodulator chains as antenna selection, significantly outperformed antenna selection and achieved most of the gains of the full complexity receiver.

For spatial multiplexing, the optimal pre-processing projects the received vector along the L largest eigenvectors of the receiver correlation matrix. As in the diversity case, a K×$N_r$ pre-processing can also be used for the spatial multiplexing.

A sub-optimal phase approximation is also described for all cases to address the practical design constraints imposed by today's RF IC technology. Given the minimal performance degradation in using this approximation, implementing receivers that use numerical searches to find the optimal phase solutions is unnecessary. This solution also outperformed the FFT Butler matrix preprocessing, which cannot adapt to variations in the mean angle of arrival.

Antenna Selection at Transmitter and Receiver

Figure 6:
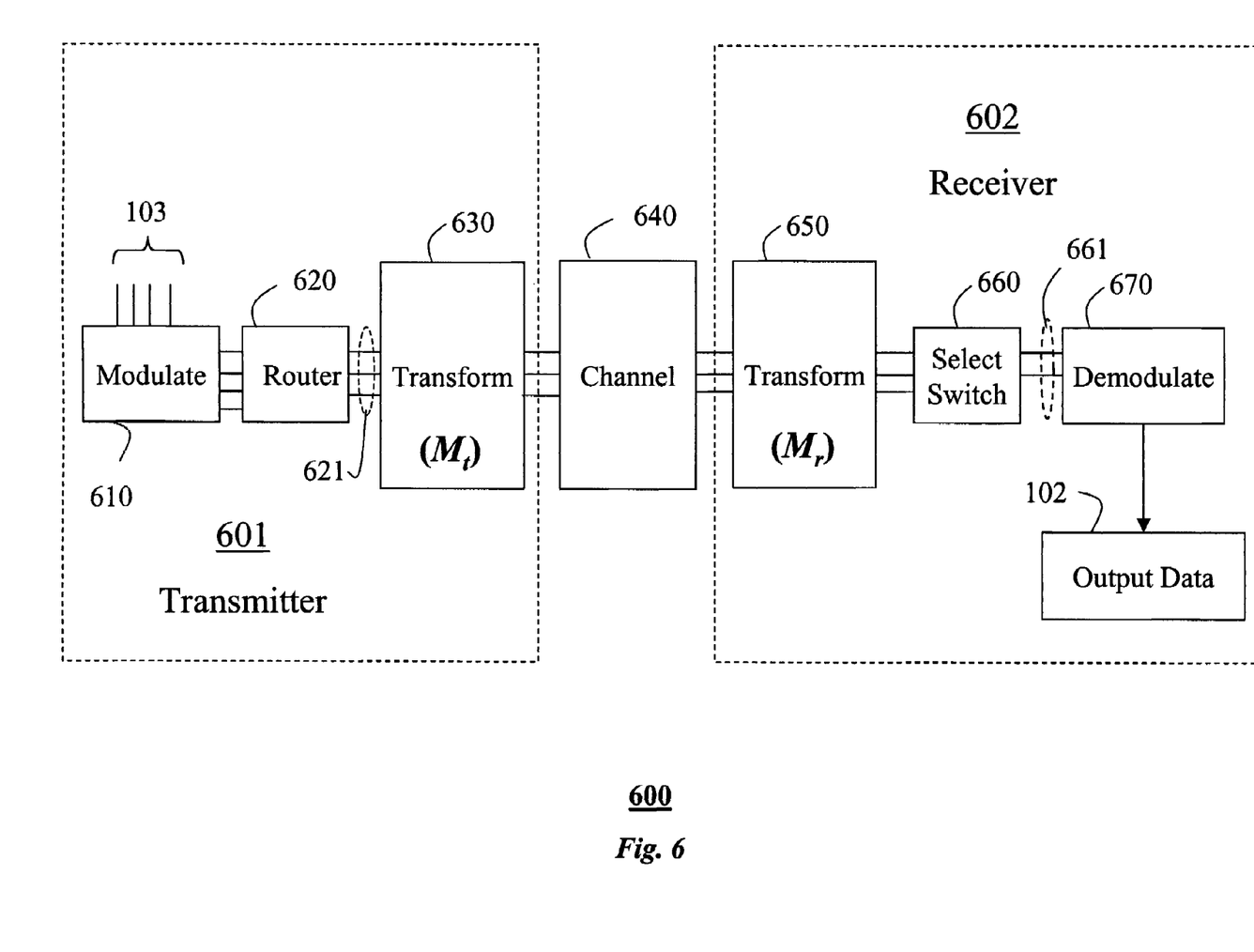
FIG. 6 is a block diagram of a spatial multiplexing system with antenna selection and RF pre-processing in a transmitter and a receiver.

FIG. 6 shows a multi-antenna system 600 that uses the antenna selection method according to the invention at both the transmitter and the receiver. In a transmitter 601, multiple substreams 103 are submitted to the modulator 610 and output as passband RF signals. These substreams can be either different signals obtained through a space-time coder in multiplexing transmission, or the same signal encoded with different weights in diversity transmission. A router 620 links these signals to branches 621 associated with the transmit antennas. The passband branches 621 are transformed 630 by a matrix operation $M_t$ 630 before they are applied to the transmit antennas, and passed through a channel 640.

At a receiver 602, the signals corresponding to the substreams are received via the channel 640 by the receive antennas. The received signals are transformed 650 by a matrix operation $M_r$ 650, and the transformed signals are selected 660. The selected signals 661 are demodulated 670. The output data 102 is detected from the demodulator stream.

Figure 7:
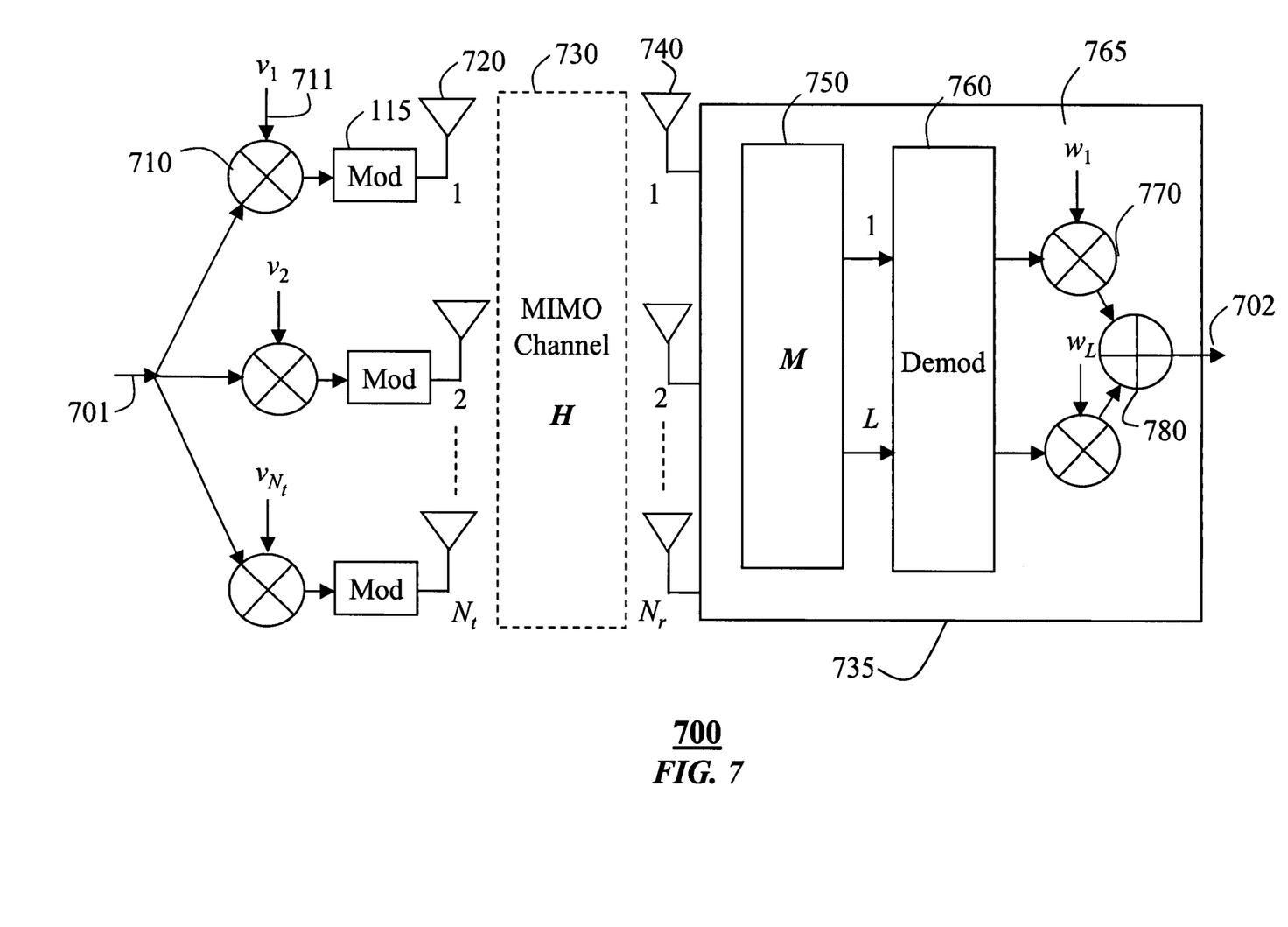
FIG. 7 is a block diagram of a spatial diversity system with RF pre-processing at the receiver, with K=L, and no antenna selection switch.

Spatial Diversity with RF Pre-Processing and No Antenna Selection in the Receiver FIG. 7 shows a spatial diversity system 700 with RF pre-processing at the receiver, with K=L, and no antenna selection switch. Multiple copies of the input bit stream 701 are multiplied 710 by $N_t$-dimensional complex weighting vector v 711 before modulation 115 to passband. Each signal is then applied to a different one of $N_t$ transmitting antennas 720. The modulated signals pass through a MIMO channel 730, with channel characteristics H.

At a receiver 735, the received signals are passed through a linear matrix operation M 750. In this case, the matrix operation performs a phase shift and antenna selection. Then, only a subset of signals L from the $N_r$ possible antennas are selected for demodulation 760. The demodulated signals are then subjected to maximal ratio combining 770 using the receiver weight vector w 765, and combined 780 to obtain an output data stream 702 that is an estimate of the input data stream 701.

Spatial Diversity with RF Pre-Processing and L/K Routing in the Transmitter

Figure 8:
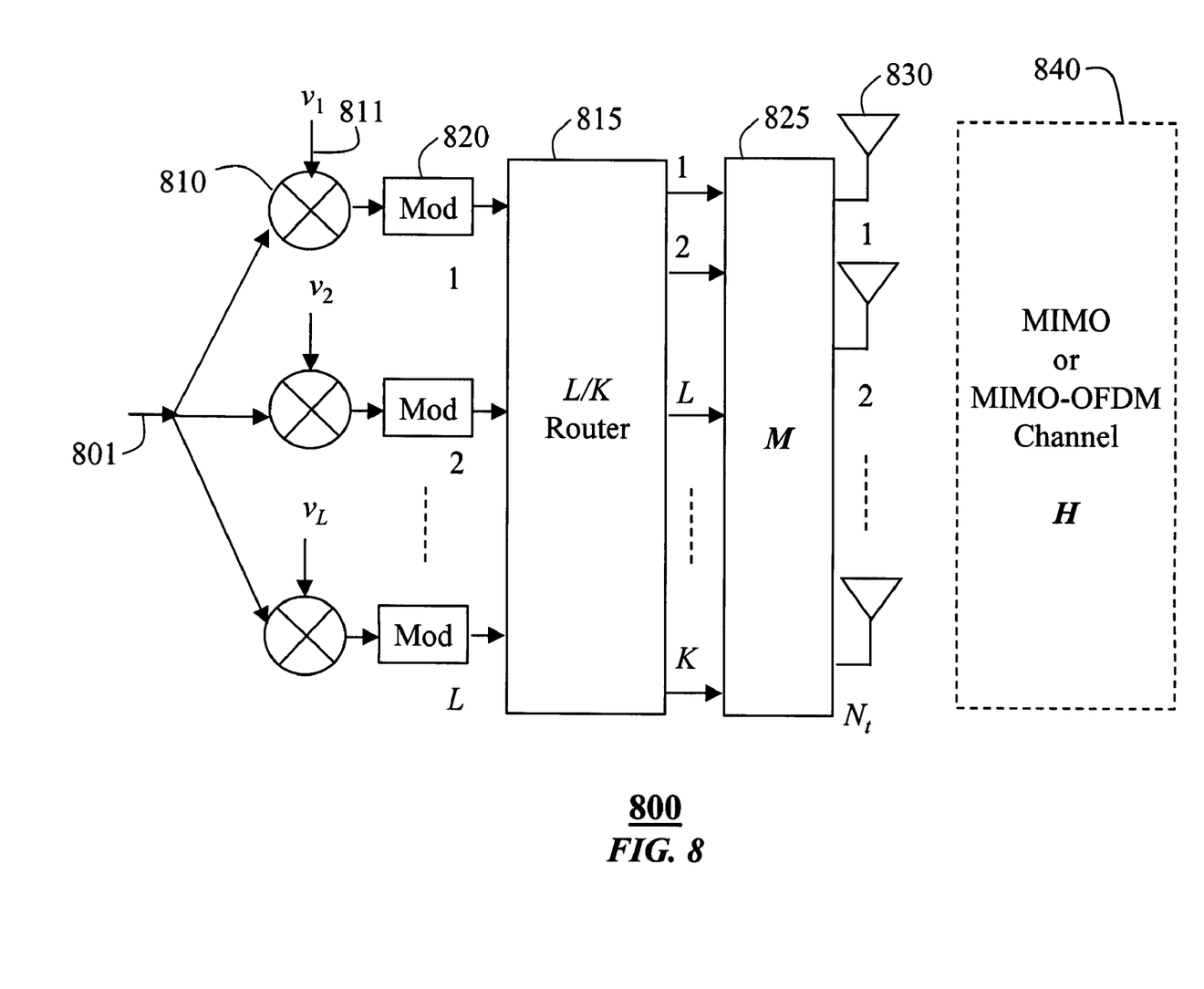
FIG. 8 is a block diagram of a spatial diversity system transmitter with RF pre-processing and a L/K router.

FIG. 8 shows a spatial diversity transmitter 800 with RF pre-processing and an L/K routing. Multiple copies of the input bit stream 801 are multiplied 810 by an L-dimensional complex weighting vector v 811 before modulation 820 to passband in the RF domain. The L transmit streams input to the router 815 are routed to L out of the K inputs of the matrix M 825 as described, and then applied to $N_t$ transmitting antennas 830. The modulated signals pass through a MIMO or MIMO-OFDM channel 840, with channel characteristics H. The receiver can be any of the structures described above.

Figure 9:
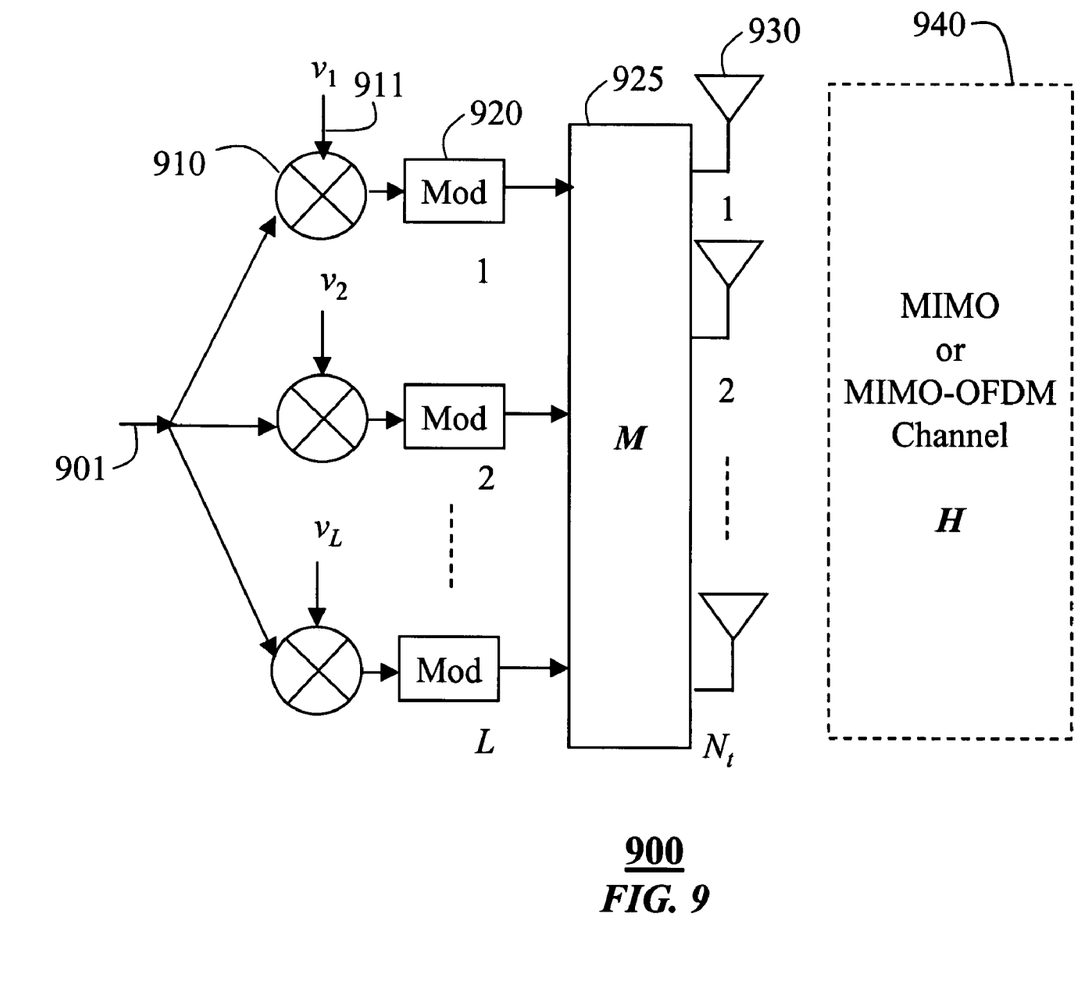
FIG. 9 is a block diagram of a spatial diversity system transmitter with RF pre-processing in the transmitter, with K=L, and no L/K router.

Spatial Diversity with RF Pre-Processing and No Signal Routing in the Transmitter FIG. 9 shows a spatial diversity transmitter 900 with RF pre-processing at the transmitter, with K=L, and no signal routing. Multiple copies of the input bit stream 901 are multiplied 910 by L-dimensional complex weighting vector v 911 before modulation 920 to passband. The L transmit streams are input into the matrix M 925 as described, and then applied to $N_t$ transmitting antennas 930. The modulated signals pass through a MIMO or MIMO-OFDM channel 940, with channel characteristics H. The receiver can be any of the structures described above.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for processing RF signals in a multiple-input, multiple-output communications system, including multiple transmit antennas and multiple receive antennas connected by a wireless channel, comprising:
generating a matrix M based on long-term characteristics of the wireless channel; and
multiplying the matrix M times the input RF signals to obtain output RF signals, in which the matrix M is in a form M=BQ, where B is a full rank matrix, and Q is an matrix of singular vectors obtained by decomposing a covariance matrix.

2. The method of claim 1, in which the generating is in a transmitter, and the output RF signals are fed to multiple transmit antennas.

3. The method of claim 2, further comprising:
modulating a plurality of input bit streams into L RF signals, in which L is a number modulator chains.

4. The method of claim 3, further comprising:
routing the L RF signals to K input RF signals of the matrix M and where the L RF signals are a subset of the K input signals to the matrix M.

5. The method of claim 1, in which the generating is in a receiver, and the input RF signals are obtained from multiple receive antennas.

6. The method of claim 5, further comprising:
demodulating a subset of the output RF signals.

7. The method of claim 6, further comprising:
selecting a subset of RF signals using the matrix M.

8. The method of claim 1, further comprising:
generating, in a transmitter, a first matrix M based on long-term characteristics of the wireless channel;
multiplying the first matrix M times first input RF signals to obtain first output RF signals fed to multiple transmit antennas;
generating, in receiver, a second matrix M based on the long-term characteristics of the wireless channel; and
multiplying the second matrix M times second input RF signals obtained from multiple receive antennas to obtain second output RF signals.

9. The method of claim 1, in which the matrix M includes a plurality of elements, and only phase characteristics of the elements are used to generate the matrix M.

10. The method of claim 9, further comprising:
setting a subset of the elements to zero.

11. The method of claim 10, in which the setting is based on amplitude characteristics of the elements.

12. The method of claim 1, in which the input RF signals are generated using spatial-diversity gain techniques in a transmitter.

13. The method of claim 1, in which the input RF signals are generated using spatial-multiplexing gain techniques in a transmitter.

14. The method of claim 1, in which a number of the output RF signals is less than a number of the input RF signals.

15. The method of claim 14, further comprising:
selecting a subset of output RF signals for demodulation.

* * * * *